United States Patent [19]
Larson

[11] Patent Number: 4,984,321
[45] Date of Patent: Jan. 15, 1991

[54] WEATHERPROOF AND FIREPROOF LOADING BRIDGE CANOPY

[75] Inventor: James Larson, East Hills, N.Y.

[73] Assignee: BridgeTech Inc., Brentwood, N.Y.

[21] Appl. No.: 423,810

[22] Filed: Oct. 18, 1989

[51] Int. Cl.⁵ .................. B65G 11/10; B65G 11/14; B65G 69/22
[52] U.S. Cl. .................. 14/71.5; 135/103; 135/107
[58] Field of Search .............. 14/71.5, 71.1, 69.5, 14/74, 71.3; 135/103, 107; 52/173 DS

[56] References Cited

U.S. PATENT DOCUMENTS

| | | | |
|---|---|---|---|
| 3,644,952 | 2/1972 | Hatch | 14/71.5 |
| 3,843,987 | 10/1974 | Lodjic | 14/71.5 |
| 4,120,067 | 10/1978 | Hone et al. | 14/71.5 |
| 4,712,339 | 12/1987 | Wenham et al. | 14/71.5 |

Primary Examiner—Stephen J. Novosad
Attorney, Agent, or Firm—Bauer & Schaffer

[57] ABSTRACT

A weatherproof and fireproof loading bridge canopy is provided having an exterior cover disposes over an expandable frame and a wall structure having at least one layer of an aluminum coated fiberglass fabric disposed on the ceiling and sides of the interior of the frame. The loading bridge has good longevity and the interiorly disposed fiberglass layer which is fireproof is easily removed for replacement as needed.

18 Claims, 2 Drawing Sheets

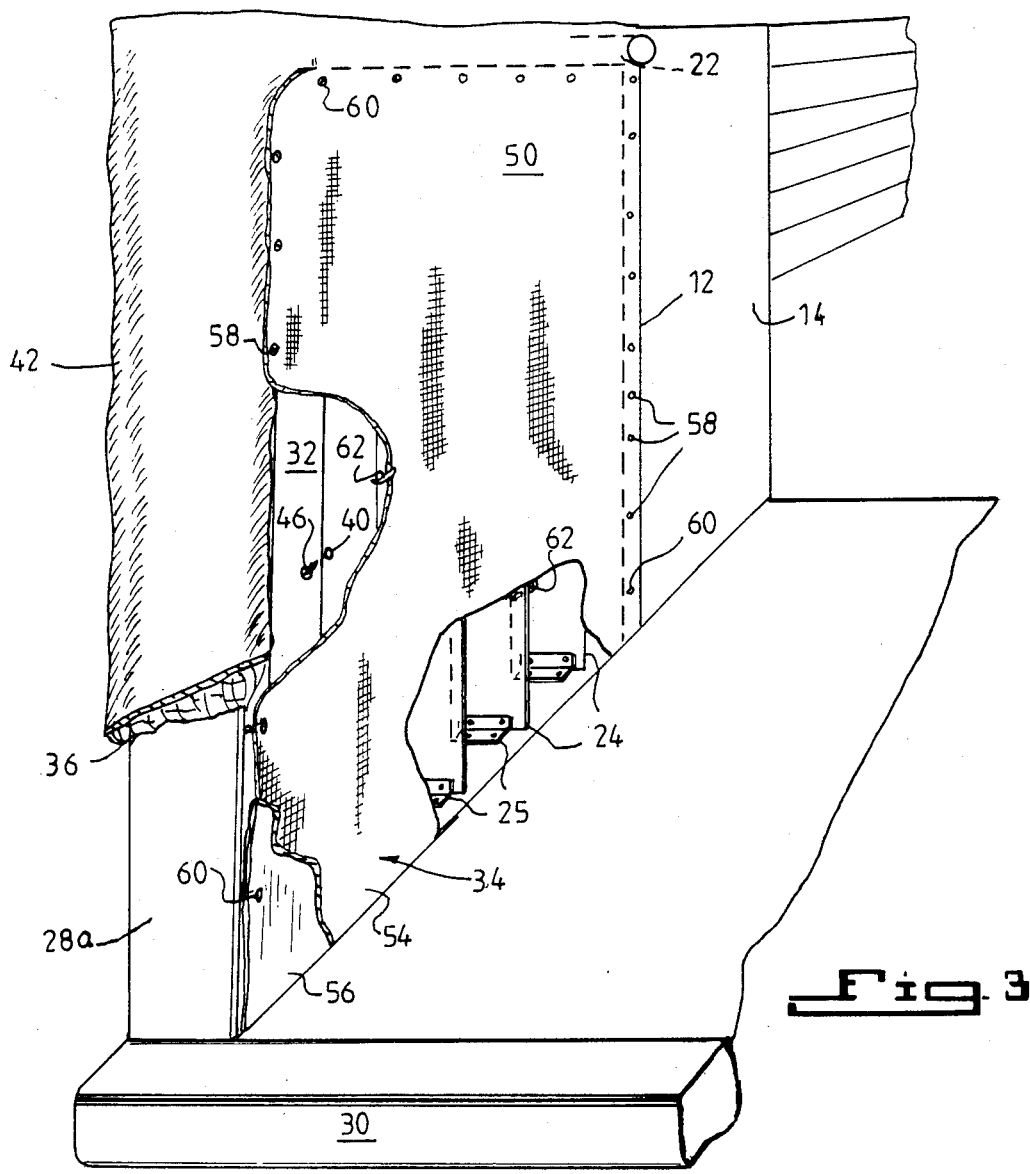
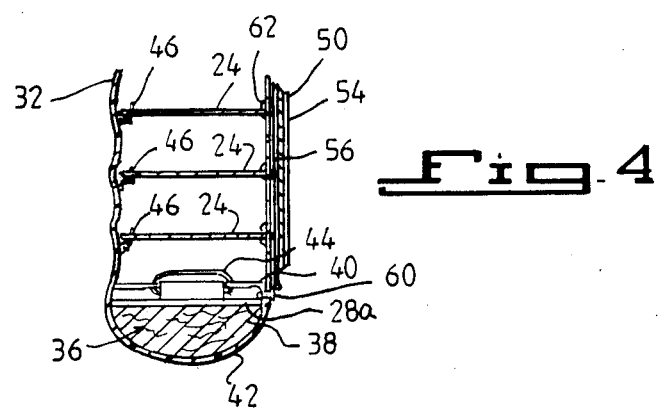

WEATHERPROOF AND FIREPROOF LOADING BRIDGE CANOPY

BACKGROUND OF THE INVENTION

The present invention relates to loading bridges and particularly, the invention relates to a weatherproof and fireproof loading bridge canopy closure which is an integral part of the entire bridge for docking airplanes and the like.

Bridges, for use in loading and unloading airplanes, ships and the like are known. Located at the forward section of the loading gate unit, such bridges comprise an accordion-like frame having a base on which are articulatingly secured a plurality of ribs defining a tunnel-like passageway and over which is located a fabric canopy. Heretofore, canopies were made from fabrics such as weatherproof vinyls which are strong, tough, weatherproof materials. While known canopies provide ample protection against weather conditions during the enplaning and deplaning of passagers, new government safety regulations, especially in regard to fire protection, made the use of such fabrics disadvantageous and obsolete since they are not fireproof.

Consequently, manufacturers are presently required to make loading bridge canopies from fireproof fabrics to satisfy new fire laws and regulations. However, fireproof fabrics are expensive, difficult to work with and in addition, when used to make canopies, exhibit a number of other disadvantages. For example, fireproof fabrics do not hold up well when constantly exposed to the sun's ultraviolet rays and rain and deteriorate rapidly. Such fabrics cannot be heat-sealed and thus require that their seams be sewn or stitched. As a result, fireproof canopies made of coated fiberglass scrim can not be made air-tight or secure against leakage. When such fabric is constantly flexed, the particles of glass actually begin to cut the outer coating, like a razor, thereby accelerating deterioration of the fabric.

In addition, the fireproof fabrics are made with at least their exterior i.e., exposed surfaces, hard and brittle so that they cannot easily fold and bend. As a consequence, as a result of the successive articulation and extension of the frame, such fabrics crack, scale and lose their ability to retard fire as well as hold up against the weather. It has thus been found that canopies made with the known fireproof materials must be replaced two or three times as often as those non-fireproof fabrics heretofore in use. Over all, the use of fireproof materials is considerably more expensive not only in raw material, but in labor and replacement costs.

There exists, therefore, a need to provide a loading bridge canopy which exhibits excellent weatherpoof properties along with good durability, as well as fireproof properties. The present invention fulfills such a need.

The foregoing objects and advantages, as well as others, will be apparent from the following disclosure of the present invention.

BRIEF STATEMENT OF THE INVENTION

In accordance with the present invention, there is provided a weatherproof and fireproof loading bridge canopy closure comprising an expandable, metallic frame having a floor on which is disposed a plurality of articulating ribs over which a canopy is disposed for expansion and contraction jointly therewith. The canopy comprises an exterior weatherproof outer cover disposed over the top and sides of the frame and an inner wall structure consisting of panels of fireproof fabric hung from the ribs along at least the opposite sides of the frame. To provide conjoint movement of the canopy and frame, the inner and outer covers are attached to the ribs of the frame respectively.

Preferably, the bridge is provided with a totally fireproof interior fully safeguarding the interior passageway while the exterior is covered with a totally weatherproof long lasting material. The interior fireproof material, while being foldable during expansion and contraction of the bridge can be hung in such a way that its bending and folding is significantly minimized so that the material will not readily or quickly crack or break.

While the exterior weatherproof material can be made of any of the now and currently used material, it is preferred that the interior fireproof material be made of sheets of aluminum coated fiberglass, so as to be heat retardant as well as fireproof, although any fireproof fabric meeting government codes can be utilized. If the fireproof fabric is coated on one surface, it is preferred that the aluminum surface face outwardly toward the weatherproof exterior cover, rather than inward of the passageway.

It is also preferred that the attachment of the panels to the frame be such that the panels are easily removable.

Full details of the present invention are set forth in the following description and the accompanying illustrations of the preferred method and product.

THE DRAWINGS

In order to describe the present invention more fully, reference is directed to the accompanying drawings which are to be taken in conjunction with the following descriptions and in which drawings:

FIG. 3 is an enlarged view of the loading bridge embodying the present invention partially in section, showing the manner by which the canopy is attached to the ribs. canopy cover; and FIG. 4 is a sectional view along line IV—IV of FIG. 2 showing the attachment of the exterior cover of the canopy to the frame.

DESCRIPTION OF THE PREFERRED EMBODIMENTS

Figure 1:
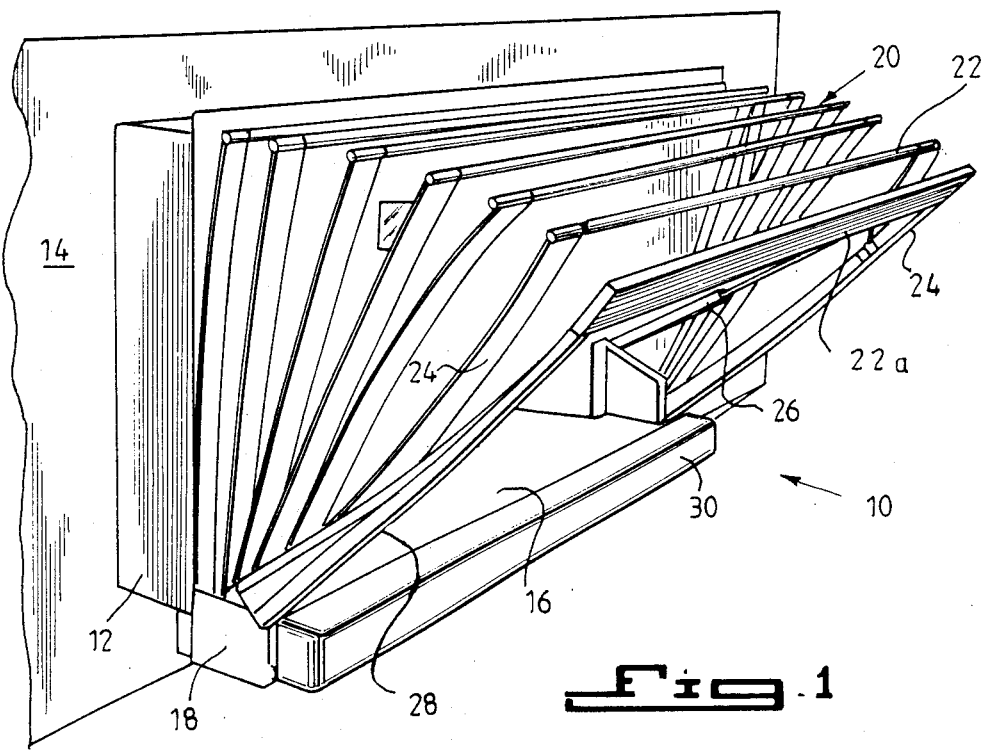
FIG. 1 is a perspective view of the frame of a weatherproof and fireproof loading bridge showing the rib construction of the frame.
Figure 2:
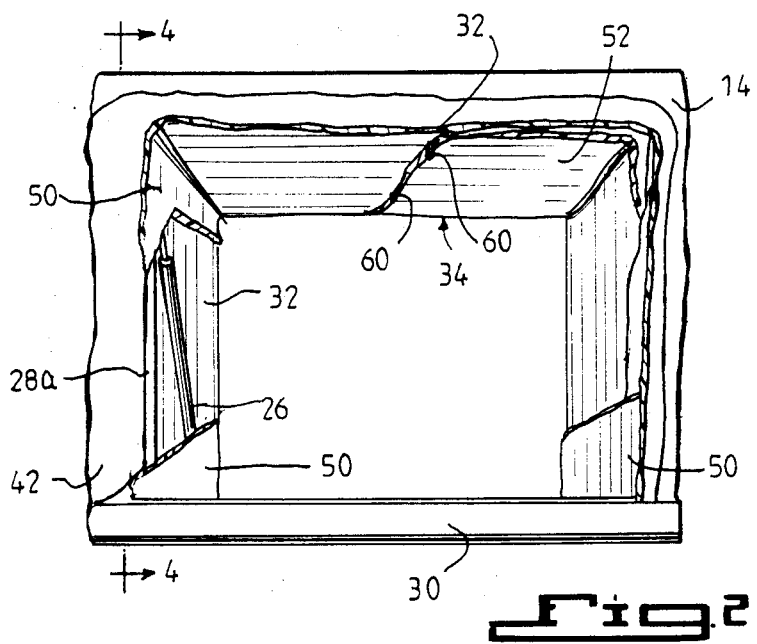
FIG. 2 is a view, partially in section looking into a partially opened bridge showing the covering in accordance with the present invention, attached of the ribs of the frame.

Referring now to FIG. 1, an articulated expandable, metallic frame, generally depicted by the numeral 10 is shown comprising a rigidly formed vertical portal 12 at its rear, adapted to be secured to the "gate" structure of a building 14 and a horizontal extendable floor 16, movable in cantileverd fashion outward and inward from the building 14 and supported in a conventional manner. On either side of the floor 16, there is mounted a carriage member 18 on which is articulatingly secured a plurality of inverted U-shaped ribs 20. Each of the ribs 20 comprise a horizontal top support 22 and parallel side struts 24 which are pivotally secured, as by hinges 25, to the respective carriage member 18 (FIG. 2). The carriage members 18 may be movable forward and aft from the rear portal 12, together with the floor 16, in conjunction with a hydraulic or pneumatic piston/cylinder device 26 as seen in FIG. 2, thus expanding and spacing the ribs 20 so as to form a retractable tunnel-like passageway.

The foremost rib 20 of the frame 10 defines a forward portal 28 which, together with an elastic bumper 30 secured to the forward edge of the floor 16 is intended to abut the surface of the airplane to complete the passage from building to plane.

For the purpose of simplifying the present disclosure, the details of the structure of the frame, not required for an understanding of the present invention, are omitted. Reference however, to the conventional frame structures, as for example as currently in use can be made, as if such details were more fully disclosed herein.

The canopy of the present invention, which is applied to the frame 10 shown in .FIG. 1 or to similar frames, is illustrated in detail in .FIG. 2. The canopy consists of an outer cover member 32 and an inner wall assembly 34 which is separate therefrom.

The outer cover 32 is disposed over the frame 10 and consists of a tent-like member of any suitable and conventional weatherproof material such as a nylon or vinyl fabric or fabric of natural or synthetic material. A particularly useful fabric for this use is that sold under the trademark "Jaton" by BridgeTech, Inc. of 171 Rodeo Drive, Brentwood, N.Y. 11717. "Jaton" is fire retardant as well as acid and oil resistant. It is made of 840 denier 16×16 nylon screen, weighing 22 to 25 oz. per square yd. 1, having a thickness of 0.032 in., a hydrostatic resistance of 360 psi, a tensile strength of 656 lbs. in both warp and fill, a warp tear strength of 148 lbs. and a fill tear strength of 165 lbs. Preferably, the outer cover 32 is made in a one-piece manner as it may be easily heat seamed and sealed against air and water leakage, so as to fit over the frame 10.

As seen in FIGS. 3 and 4, the outer cover 32 is enlarged at its forward end to provide a pocket 36 into which fiber fill 38 may be placed. In addition, the pocket 36 is backed by a pair of vertically extending tabs or flaps 40 so that this portion of the outer cover 32 will fit over the vertical struts 24 of the forward portal 28 and top to provide a padded bezel as a companion to the horizontal bumper 30. The flaps 40 are laced together by suitable cords or tethers 44 along the back side of the strut and top support. The padded bezel 42 is utilized so as not to let the bridge enclosure damage the aircraft's skin.

The remainder of the outer cover 32 is secured at vertical and horizontal intervals to the respective struts 24 and top supports 22 of each of the ribs 20 by screws or bolts 46. The bolts 46 are secured in holes 48 formed in the struts 24 or more fully about the struts 24. Other means for fastening the exterior cover such as snaps, screws, pins or the like, may be employed. It is preferable that the outer cover 32 be fastened to each strut 24 a number of times along the length of each strut so that the outer cover 32 can be efficiently and easily folded and unfolded, accordion style, without entanglement or tearing, as the frame is expanded or closed. The top of the outer cover may require fewer fasteners since gravity will hold the material in place.

The interior wall assembly 34 of the canopy 30, as shown in FIG. 2, is preferably formed of three separate panels consisting of a pair of side panels 50 and a ceiling panel 52. This tri-part construction is desirable since it enables the canopy to be more easily installed, repaired in part and replaced when necessary. Further, because of the peculiarity in the laws between municipal jurisdictions a ceiling panel is not always prescribed and in some instances is in fact proscribed. Each panel 50, 52 comprises a sheet, coextensive with the largest dimensions assumed by the corresponding wall or section of the frame 10 when extended, so as to cover the respective wall or section fully, but without any undue excess material or flacidity. Each of the panels 50 and 52 is formed of at least one layer of fiberglass fabric 54 coated intimately with a coextensive film 56 of aluminum on at least one surface. Although aluminum is exdemplified, other coatings or films, such as of silicone, KEVLAR and the like may be used.

The side panels 50 are removably secured to the ribs 20 of the frame 10 by providing, along the perimeter of each panel 56, a series of spaced grommets 58 through which self tapping screws 60 or other fasteners are inserted directly into the studs of the rear and forward portals 12 and 28 and to top frame 10, 22 respectively. Preferably, the fire resistant surface 56 of the panel faces inwardly toward the ribs 20 of the frame, if the panel 50 is coated on only one side. This inner fire resistant surface 56 is also provided with several rows of string or ribbon ties 62 (nylon or the like) which are tied to the individual ribs 22 so that the panel held to the frame will be caused to fold as the frame is closed and opened, so as not to entangle or tear.

Should the panel 50 be constructed of two sheets of fireproof fabric, the sheets are hung in series with the fire resistant surfaces both facing in inwardly toward the ribs. Both sheets are supported by self-tapping screws or the like at their peripheries. The remainder of the panel is secured to the ribs with nylon ties or the like, in order to prevent entanglement or tearing as the frame is expanded or closed.

The ceiling panel 52 of the inner wall structure is disposed in the system in a like manner as for the side panels 50, being provided with grommets 58 along their perimeter and attached to the upper supports 22 of the frame 10 by self-tapping screws and ties such as used for the side panels.

While any of a wide variety of fireproof fabrics may be used in a canopy of the present invention, a suitable fabric is one that meets the requirements of NFPA 417-85, Chapter 3, entitled "Standards On Construction and Protection of Aircraft Loading Walkways". A particularly useful fabric of this type is an aluminum coated fiberglass fabric sold under the name of Gentex 1018 Dual Mirror, a trademark of Gentex Corp., Carbondale, Penna., 18407. This fabric is an aluminum coated (one side only) fiberglass fabric having a weight of 16 oz./sq. yd., a thickness of 0.017 in., a breaking strength of 550 lbs. in the warp direction and 400 lbs. in the fill direction, a flammability length of 0.5 in. and a reflectivity of 15 sec.

The weatherproof and fireproof loading bridge canopy in accordance with the present invention provides many advantages. For example, it can be made mostly from currently available materials. It provides a life expectancy of a weatherproof canopy of about 5 to 7 years which exceeds the life expectancy of only 1 year for a fireproof canopy which is exposed to the elements. The present canopy has the advantages of the fireproof canopy in that its interior tunnel is fully fireproof, smokeproof and heat resistant. Furthermore, the fireproof fiberglass interiors, due to their unique physical construction, can easily be removed and replaced when they have exhausted their useful life without dismantling the entire frame and/or canopy structure. Replacement of the fireproof parts can be made at the site of the bridge in a few hours and the bridge as a whole does not have to be put out of service for repairs. In addition, a canopy closure according to the present invention, is advantageous requiring only about 15 yards of fireproof material, as compared to 40 yards of such material required for a full canopy of the same.

At present, other manufacturers, when confronted with fire prevention, merely manufactured the entire single outer layer entirely from available fireproof fabrics in lieu of the weatherproof nylon vinyl. The result has left the user with inaffective and expensive closures that do not provide satisfactory protection from inclement weather and deteriorate rapidly.

We must also make known that, because of this unique multiple component design, any existing nylon vinyl canopy can be retrofitted with the interior fireproof panels to instantly meet the fire regulations set forth.

Various modifications, changes and embodiments have besesn described herein and others will be obvious to those skilled in the art. Accordingly the present disclosure is to be taken as illustrative only and not limiting of the invention described.

I claim:

1. A loading bridge comprising an expandable frame comprising a floor and a plurality of inverted U-shaped ribs articulatingly mounted on said floor defining a tunnel-like passageway, a canopy for enclosing said frame comprising an exterior cover draped over said ribs on the exterior thereof and an inner wall structure comprising at least a pair of opposed fireproof panels hung from said ribs on the interior thereof.

2. The loading bridge according to claim 1, wherein said cover comprises a unitary weatherproof fabric.

3. The loading bridge according to claim 1, wherein said inner wall includes a ceiling member hung from the top of said ribs.

4. The loading bridge according to claim 1, wherein said panels are removably secured to said ribs.

5. A weatherproof and fireproof loading bridge canopy closure comprising an expandable metallic frame having a base member, a plurality of U-shaped ribs disposed on said base member, said ribs having their ends attached to said base member and adapted to pivot with respect thereto at the points of their connection therewith, an exterior weatherproof cover disposed over the top and sides of said frame and attached to said ribs for expansion and contraction therewith, an inner wall structure and at least one layer of fireproof fabric disposed on the interior of the top and sides of said frame and attached to said robs for movement therewith.

6. The weatherproof and fireproof loading bridge according to claim 5, including a second layer of fireproof fabric disposed on the interior of the top and sides of the frame in series with the first layer of fireproof fabric.

7. The weatherproof and fireproof loading bridge according to claim 6, wherein the layer of fireproof fabric is comprised of side panels and a top panel which are provided along their perimetric edges with grommets, said side panels being attached to the frame by screws passing through said grommets along the top edges thereof, the front and rear edges thereof being laced to said frame and a top panel being attached to said frame by self-tapping screws passing through said grommets along the side edges thereof and the front and rear edges thereof being laced to said frame.

8. The weatherproof and fireproof loading bridge according to claim 7, wherein the side and top panels of the layer of fireproof fabric include a plurality of ties disposed on the fire resistant coated sides thereof and on also attached to the frame with said tie.

9. A weatherproof and fireproof loading bridge according to claim 8, wherein the side and top panels of the layer of fireproof fabric include a plurality of ties disposed on both sides thereof and a second layer of fireproof fabric of like construction, but having a plurality of ties disposed only on the fire resistant sides of the panels thereof, said layers being attached to each other by said ties, the fire resistant coated sides of said layers being disposed on the interior of the top and sides of the frame in series.

10. The weatherproof and fireproof loading bridge according to claim 5, wherein the exterior cover is a nylon-vinyl fabric.

11. The weaterpróof and fireproof loading bridge according to claim 5, wherein the exterior cover is provided along its front, rear and top edges with grommets and is attached to the frame by screws passing through said grommets along its top edge and its front and rear edges are laced over the front and rear sides of said frame, respectively.

12. The weatherproof and fireproof loading bridge according to claim 5 wherein said fireproof fabric comprises at least one sheet of aluminum coated fiberglass.

13. The weatherproof and fireproof loading bridge according to claim 5, wherein the fireproof fabric is an aluminum coated fiberglass fabric which has at least the following minimum properties: a thickness of 017 in., a breaking strength of 550 lbs. in the warp direction and 400 lbs. in the fill direction, a tear strength of 18.0 lbs. in a warp direction and 17 lbs. in the fill direction.

14. The weatherproof and fireproof loading bridge canopy closure according to claim 13, wherein the exterior weatherproof cover is made of a nylon or vinyl fabric which is fire retardant, resistant to acid and oil, and is constructed of 840 denier 16×16 nylon screen, weighing 22 to 25 oz./ sq. yd,. a thickness of 0.32 in., has a hydrostatic resistance of 360 psi, a tensile strength of 656 lbs. in both warp and fill, a warp tear strength of 148 lbs. and a fill tear strength of 165 lbs.

15. A canopy closure for a loading bridge having an articulated rib structure capable of expansion into a tunnel-like passageway and collapsible therefrom, said closure comprising an exterior cover draped over said rib structure and an interior wall assembly comprising at least a pair of opposed fireproof panels hung from said ribs.

16. The canopy closure according to claim 15, wherein said fireproof panels comprised of a sheet of fiberglass coated on at least one side with a fire resistant film.

17. The canopy closure according to claim 16, wherein said fire resistant film is aluminum.

18. The canopy closure according to claim 15, including means for removably securing said interior wall assembly to said ribs.

* * * * *

UNITED STATES PATENT AND TRADEMARK OFFICE
CERTIFICATE OF CORRECTION

PATENT NO. : 4,984,321

DATED : January 15, 1991

INVENTOR(S) : JAMES LARSON

It is certified that error appears in the above-identified patent and that said Letters Patent is hereby corrected as shown below:

```
Column 5, line 54 "robs" should be --ribs--

Column 6, line 9 "and on" should be --and one-- line 24 please correct the spelling of
         "weatherproof"

line 37 "017 in." should be --0.017 in.-- line 46 "0.32 in." should be --0.032 in.--
```

Signed and Sealed this

Twenty-third Day of June, 1992

Attest:

*Attesting Officer*

DOUGLAS B. COMER

Acting Commissioner of Patents and Trademarks